United States Patent [19]

Peterson

[11] 3,730,064
[45] May 1, 1973

[54] QUENCH CONTROL CALCULATOR

[75] Inventor: Dean M. Peterson, Fort Washington, Pa.

[73] Assignee: Honeywell Inc., Minneapolis, Minn.

[22] Filed: Dec. 6, 1971

[21] Appl. No.: 204,868

[52] U.S. Cl. ............95/10 C, 95/64 A, 235/64.7
[51] Int. Cl. .............................G01j 1/52
[58] Field of Search ..............95/10 B, 10 R, 10 C, 95/10 PO, 64 A, 64 R; 235/64.7

[56] References Cited

UNITED STATES PATENTS

| 2,924,144 | 2/1960 | Bakke et al. | 235/64.7 |
| 3,072,029 | 1/1963 | Leitz | 95/10 C |
| 3,481,258 | 12/1969 | Mori et al. | 95/10 C |

Primary Examiner—Samuel S. Matthews
Assistant Examiner—Fred L. Braun
Attorney—Arthur H. Swanson et al.

[57] ABSTRACT

A first selection device selectively designates a power level to be used in a light producing unit and accordingly adjusts a first light attenuation device which is effective to attenuate the light directed toward an associated light sensing apparatus from a scene being photographed. A reference indicium is thereby established in accordance with the selected power level and with respect to a second selection device. The second selection device features two scales in a fixed relationship with respect to each other. The first scale includes indicia representative of various film speeds and the second scale includes indicia representative of the various $f$ numbers of a camera lens apparatus. The second selection device is operable to align a selected film speed indicium with the reference indicium, thereby fixing the second selection device with respect to the reference indicium on the first selection device. A third selection device includes indicia representative of various camera-to-scene ranges and a corresponding pointer associated with each of the several indicia. The third selection device is operable to designate a selected range and accordingly to adjust a second light attenuation device which affects the light directed toward the light sensing apparatus from the scene being photographed. The pointer associated with the selected camera-to-scene range, points to a recommended $f$ number on the second scale of the second selection device. A coupling automatically adjusts the camera lens apparatus in accordance with that recommended $f$ number.

7 Claims, 4 Drawing Figures

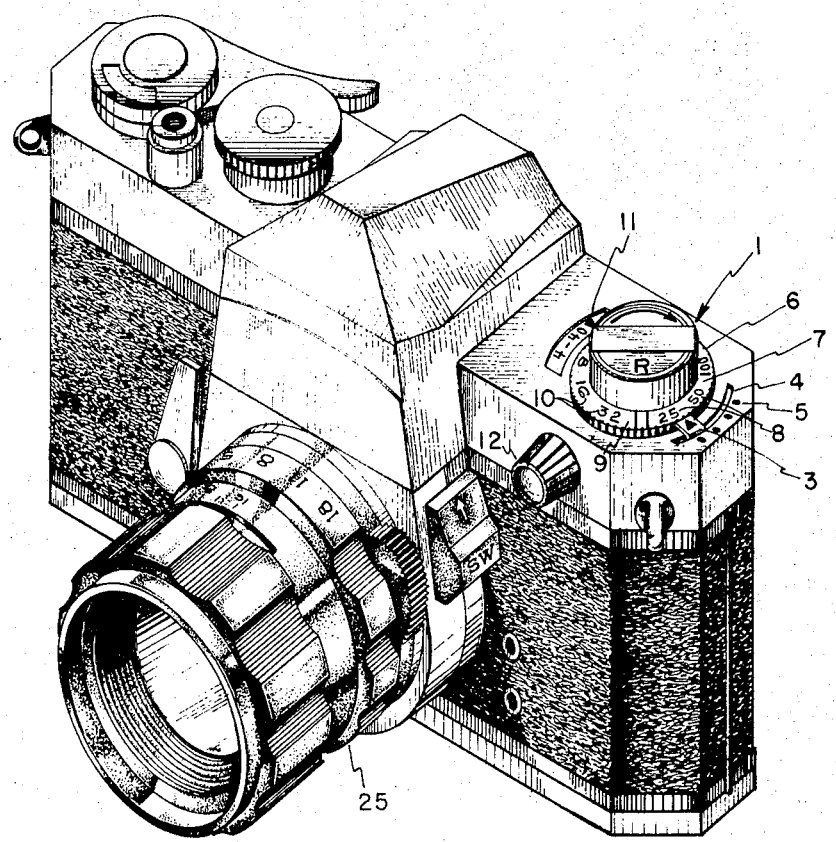
FIG. I
INVENTOR.
DEAN M. PETERSON

Patented May 1, 1973

INVENTOR.
DEAN M. PETERSON

BY Lockwood D Burton

ATTORNEY

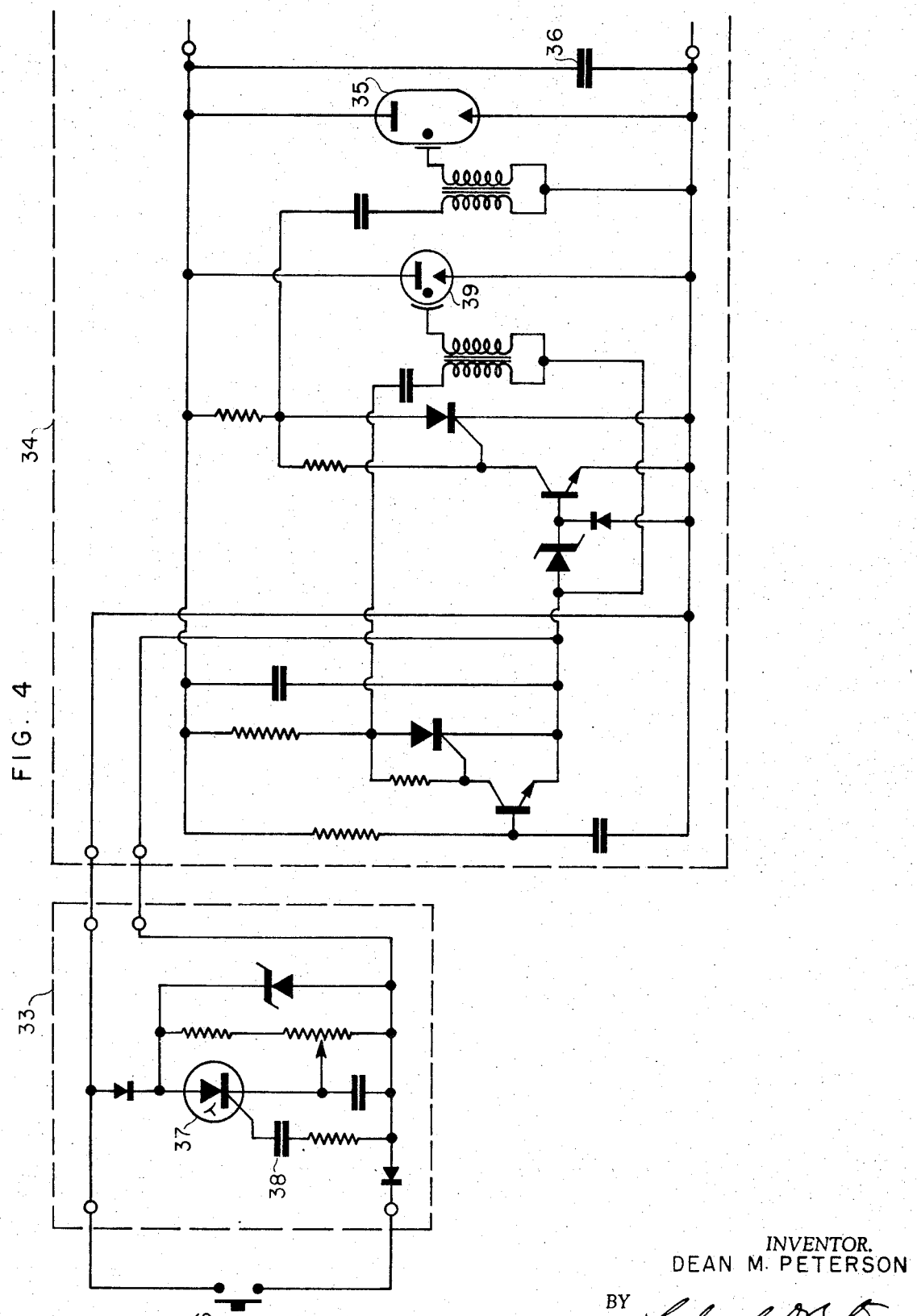

QUENCH CONTROL CALCULATOR

Subject matter disclosed but not claimed herein is disclosed and claimed in a copending application of Francis T. Ogawa, Ser. No. 108,876, filed on Jan. 22, 1971.

The present invention related generally to computer-type photoflash systems and, particularly, to a unique calculating apparatus which cooperates with a light sensing means to automatically attenuate the light received by a light sensing means in accordance with various independent and dependent variables associated with a particular picture taking environment.

Computer-type photoflash systems are generally well known in the art. Basically, a light producing means is selectively actuated to furnish light for the illumination of a scene to be photographed. A light sensing means senses light received from that scene and, upon receipt of a predetermined quantity of light, generates a quench signal which is effective to terminate the light being produced. An example of such a computer flash system as disclosed in the above-referenced copending application by Francis T. Ogawa, which is included herein by reference. In computer-type systems, there are a plurality of variables which must be coordinated for an optimum picture. For example, the power level of the light producing means partially determines the quantity of light available to illuminate a scene being photographed. The film speed used in the camera of the photographic system determines the sensitivity of the film to the light received from the scene being photographed. The camera-to-scene distance, and the depth of focus desired, affect the amount of time required between the generation of a flash signal and the actual termination of the artificially produced light, in order to properly expose the light sensitive film of the camera. The f-stop setting of the lens system of a camera is related to the camera-to-scene distance and also to the depth of focus desired. In those prior are systems, the above-mentioned variables have not been effectively correlated by a single system.

Some prior art systems have included a calculator per se, which enables a photographer to determine the recommended settings of the above-mentioned variables. Those systems, however, have not been entirely satisfactory in that a recommended group of settings read from a calculator did not always coincide with the settings required to define the actual picture-taking environment. For example, a calculator may show that if the power level of the light producing means is at a selected setting, the computer flash system will function effectively. However, if the photographer requires a different power level for a more or less depth brightness, the computer aspect of the photoflash system will not function effectively, and the photographer would have to take the picture without the aid of the computer-quench circuit. Further, a photographer has been restricted to only a few combinations of settings of the several variables for which the computer quenching operation would function. Therefore, while calculators per se provide a measure of correlation of the several variables, they have not been sufficiently integrated within an associated photographic system, to afford maximum automation of operation.

A few prior art systems have attempted to enlarge the photographer's flexibility by varying the sensitivity of the light sensing means of a computer-type photoflash system in accordance with a selected power level. Those systems, however, do not provide any more flexibility to the photographer insofar as his selection of a range is concerned. Further, since in those systems, the light sensor is mounted with the light producing means, the sensed light is not a true indication of the light exposing a light sensitive film of an associated camera means. For example, if a scene to be photographed is to be indirectly lighted, the light received by a light sensing means which is mounted on a light producing means, only represents that light reflected from the scene back to the light producing means, and not the light which is reflected back to, an actually exposes, the light sensitive film of a camera.

It is accordingly an object of the present invention to provide a computer type photo-flash system which obviates the disadvantages of the prior art apparatus.

It is another object of the present invention to provide a computer type photographic apparatus which effectively coordinates a plurality of variables associated with a particular photographic environment in order to provide an optimum photograph.

It is a further object of the present invention to provide a calculator which is selectively operable to dial-in different values of power level, film speed, and subject-to-camera range, and read out an $f$ number setting for a camera lens system which will produce an optimum photograph for those values.

It is still a further object of the present invention to provide a calculator, as set forth, which is mounted on a camera means.

It is still another object of the present invention to provide an "on camera" calculator, as set forth, which will automatically adjust the lens system of the camera and accordance with a calculated $f$ number for the selected values of power level, film speed, and range.

In accomplishing these and other objects there has been provided, in accordance with the present invention, an "on camera" calculator which is operable to coordinate selectively set-in values of power level, film speed, and range, and automatically adjust the lens system of a camera in accordance therewith, whereby to obtain an optimum photograph with those particular set-in values. Means are also provided to adjust the effective sensitivity of a light sensing means in accordance with the selected values of power level, film speed, and range, whereby advantage may be taken of the quenching operation for a greater number of selected combinations of photographic variables.

A better understanding of the present invention may be had from the following description when read in connection with the accompanying drawings in which:

FIG. 1 is an illustration of a calculator according to the present invention.

FIG. 4 is a schematic diagram of a computer type photoflash circuit.

Figure 3:
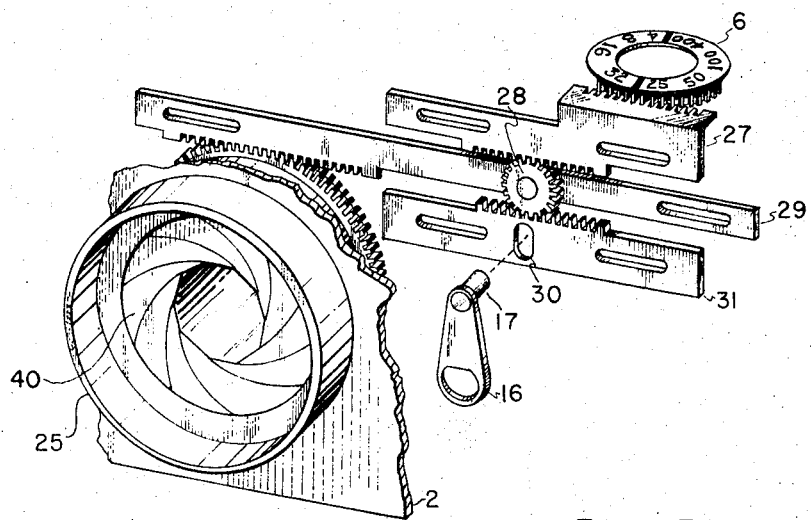
FIG. 3 is an illustration of a coupling means which may be used in connection with the subject calculator and camera means.

Referring in more detail to FIG. 1, an exemplary embodiment of a calculator 1 is mounted on a portion of a camera 2. The camera 2 includes a lens means 25. The lens means 25 further includes an adjustable apperture 40 as shown in FIG. 3. The lens means 25 allows light from a scene being photographed to pass therethrough to the usual light sensitive film means mounted within the camera. The calculator 1 includes a first selection means comprising in the indicator 3 which is moveable within a slot 4 to designate one of a plurality of distinct indicium 5, each representing a corresponding power level of a light producing means. A second selection means or bezel 6 includes a first scale means 7 having first indicia 8 imprinted thereon, and a second scale means 9 having second indicia 10. A viewing or window means 11 displays one of a plurality of values which may be selected by a third selection means which is controlled by a rotatable knob 12.

Figure 2:
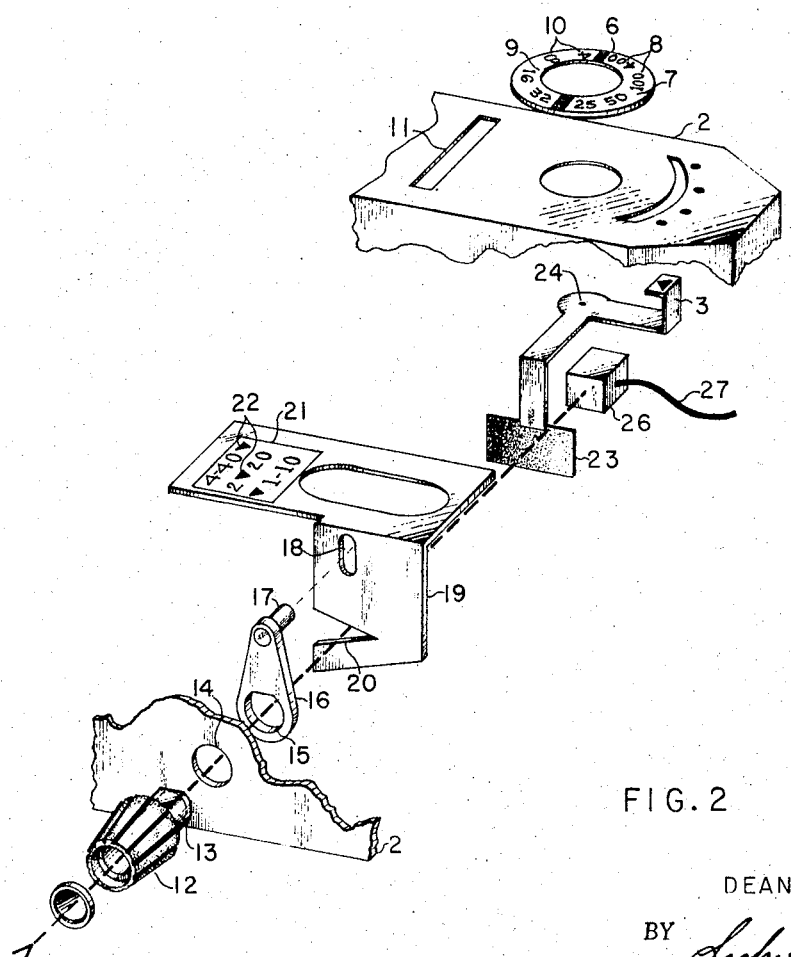
FIG. 2 is an exploded schematic diagram of the major components comprising the calculator.

As shown more clearly in FIG. 2, the third selection means generally comprises the rotatable knob or dial 12, which has a cylindrical extension 13. The cylindrical extension 13 passes through a recess 14 in the body of the camera 2 and engages a slot 15 of a coupling means 16. A projection 17 of the coupling means 16 engages a slot 18 of a sliding member 19. A sliding member 19 includes a variable light attenuator or gate 20 and a scale means 21. The scale means 21 has imprinted thereon a plurality of discrete ranges, with each discrete range indicium associated with a corresponding pointer means 22. A light sensing or light responsive means 26 may be connected to, and included as a part of, a computer type photographic circuit, such as shown in FIG. 4, by the Light Activated Silicon Controlled Rectifier (LASCR) 37.

The first selection means is also shown in more detail in FIG. 2 and includes the moveable indicator 3 which is physically coupled to another variable light attenuator or light gate 23. The indicator 3 and the light attenuator 23 move together as one member which pivots about a point 24. When the components shown in FIG. 2 are assembled, light received from a scene being photographed will pass through the knob 12, the cylindrical extension 13, the slot 15, the light attenuator 23, to the light responsive or light sensing means 26.

As shown in FIG. 3, the bezel or second selection means 6 is mechanically coupled through a first gear means 27 to a rotating geared wheel 28 which freely rotates about a point on an actuating mechanism 29. The coupling means 16 of the third selection means, moves within a slot 30 to effect the movement of a second gear means 31, which in turn rotates the geared wheel 28. The actuating mechanism 29 is mechanically coupled to the lens means 25 of the camera 2. When the bezel 6 is rotated clockwise, the first gear means 27 will move to the left thereby causing the geared wheel 28 to rotate. Since the coupling means 16 remains stationary unless an external force is applied to the knob 12, and the geared wheel 28 is pinned at its center to the actuating mechanism 29, the actuating mechanism is forced to move to the left as the geared wheel 28 rotates, thereby adjusting the variable aperture 40 of the lens means 25 in accordance therewith. A similar functioning occurs when the knob 12 causes the coupling means 16 to rotate in a counter clockwise direction. Through the engagement of the coupling means 16 with the slot 30, the counter clockwise rotation of the coupling means 16 causes the geared wheel 28 to rotate in a clockwise direction. Since the first gear means 27 remains stationary, the actuating mechanism 29 is forced to move to the left, riding on the first gear means 27. Thus, the lens means 25, including the variable aperture 40, is adjusted in variable accordance with adjustments made in the second selection means as represented by the bezel 6, and the third selection means as represented by the coupling means 16.

In the exemplary computer type photo-flash circuit shown in FIG. 4, a shutter switch S of an associated camera means is selectively actuable for producing an electrical effect which when transmitted through a light sensing circuit 33 and applied to a flash circuit 34, is effective to initiate conduction through a flash tube 35. A main storage capacitor 36 is maintained in a charged state, and when the flash tube 35 becomes conductive, the charge on the capacitor 36 is dumped therethrough whereby to furnish light to illuminate a scene being photographed. Selection means may be provided to allow a photographer to select the steady-state level to which the capacitor 36 will charge, thereby changing the power level of the light producing means 34 and hence the intensity level of the light produced thereby. When the flash tube 35 becomes conductive, a light responsive or light sensing means 37 is enabled to monitor the scene being photographed and provide a control signal in variable accordance with the light received thereby. In the present example, the light responsive or light sensing means 37 is a light activated silicon controlled rectifier (LASCR), and the control signal is the voltage at the gate terminal of the LASCR. As light is received from the scene being photographed, a current representative thereof flows from the gate terminal of the LASCR 37 and is stored by a capacitor 38. When the charge on the capacitor 38 exceeds a predetermined value, the gate-cathode junction of the LASCR 37 becomes forward biased, and the LASCR 37 becomes conductive. The conduction through the LASCR 37 produces another electrical effect which is transmitted to the flash circuit 34 and operates to initiate conduction through a quench tube 39 which is connected in parallel to the flash tube 35. Since the quench tube 39 has a much lower conducting resistance than the flash tube 35, conduction through the quench tube 39 effectively short circuits the flash tube 35 and rapidly discharges the capacitor 36. When the voltage across the flash tube 35 and the quench tube 39 has dissipated to a predetermined value, both tubes will cease conducting, thereby allowing the capacitor 36 to be recharged to its ready state to await initiation of another cycle by the shutter switch S. The computer type photoflash circuit of FIG. 4 is completely described, and the novel features thereof claimed, in the above referenced copending application of Francis T. Ogawa. Only a brief description of the circuit has herein been set forth since the details of operation of that circuit are not essential to the understanding of the present invention.

In operating the calculator of the present invention, a photographer would adjust the indicator 3 in accordance with the power level of the flash unit to be used in taking a picture. The variable attenuator or light gate 23, which, in the present example, is a filter of varying opacity, is accordingly adjusted to vary the attentuation of the light sensing means 26. The light sensing means 26 of the present invention may be the LASCR 37 of FIG. 4. A photographer would next align a particular one of the film speed indicia 8 on scale 7, (which corresponds to the film speed of the photographic film being used), with the pre-set Indicator 3. That setting, in turn, sets the scale 9 in a fixed relationship with the indicator 3. Finally, the photographer would adjust the range dial on knob 12 until the particular range desired shows through the viewing or window means 11. That adjustment varies the opening of the light attentuation or gate means 20 thereby providing additional control of the light received by the light sensing means 26 from the scene being photographed. When the desired range shows through the window 11, the photographer reads the indicated $f$ number on the second scale means 9 of the second selection means 6 which is opposite the pointer means 22 of the third selection means. That $f$ number represents the $f$ number which, when set into the camera lens system 25, will produce an optimum photographic reproduction of the scene being photographed. The $f$ number may be automatically set into the lens means 25 of a camera by using the mechanical coupling means shown in FIG. 3, thereby eliminating a separate manual adjustment. While the exemplary embodiment of the present invention utilizes light attentuators or gates to vary the effective sensitivity of the light sensing means in accordance with changes in the photographic environment, other means may be readily adopted to accomplish the same result.

Thus, there has been provided, an "on camera" calculator which is selectively operable to coordinate power level, film speed, and range, of a particular photographic system, and indicate a recommended $f$ number setting of the lens system of an associated camera which, when set into the lens system, will produce an optimum photographic reproduction of a scene being photographed. The calculator is further characterized by the inclusion of two light attentuators or light gates affecting the light received by a light sensing means of a computer type photographic circuit whereby to compensate the light sensing means for the desired values of flash unit power level and range whereby to provide a photographer with a larger range of suitable $f$ numbers with which the computer circuitry may be compatible.

The embodiments of the invention in which an exclusive property or privilege is claimed are defined as follows:

1. An apparatus comprising:
   first selection means selectively operable for selecting one of a plurality of settings which represent various magnitudes of a first independent variable and providing a reference indicium in accordance with said first independent variable selection;
   second selection means having first and second scale indicia thereon, said second selection means being selectively adjustable for aligning a setting on said first scale indicia, representative of a selection of a second independent variable, to said reference indicium, whereby to fix said second selection means in position with respect to said reference indicium;
   third selection means selectively operable for selecting one of a plurality of settings thereon, representative of various values of a third independent variable, said third selection means further including means for simultaneously indicating, for each selection of a value of said third independent variable, a corresponding setting on said second scale indicia representative of a dependent variable, said dependent variable being dependent upon said first, second, and third independent variables.

2. In a photographic system wherein a light producing means is selectively operable to provide a source light for the illumination of a scene being photographed, and wherein a camera means is arranged to receive light from said scene thereby exposing a light sensitive film included therein, and a light sensing means is positioned to receive light from said scene being photographed, and operable to provide a quench signal upon receipt of the predetermined amount of said light, said quench signal being effective to terminate the production of light from said light producing means, a calculator means comprising:
   a first light attentuator positioned between said light sensing means and said scene being photographed;
   first selection means coupled to said first light attentuator and selectively operable for providing a reference indicium, and for adjusting said first light attentuator in variable accordance with a selection of a first independent variable of said photographic system by said first selection means;
   second selection means having a first and second scale indicia thereon, said second selection means being selectively adjustable for relating a setting of said first scale indicia, representative of a selection of a second independent variable of said photographic system, to said reference indicium, whereby to fix said second selection means in position with respect to said reference indicium;
   a second light attentuator positioned between said light sensing means and said scene being photographed; and
   a third selection means coupled to said second light attentuator and selectively operable for displaying a setting representative of a selection of a third independent variable, and for adjusting said second light attentuator in variable accordance therewith, thereby simultaneously indicating, with the selection of said third independent variable, a corresponding setting on said second scale indicia representative of a dependent variable, said dependent variable being dependent upon said first, second, and third independent variables of said photographic system, whereby to indicate to a photographer a proper value of said dependent variable, and to automatically affect the light received by said light sensing means in accordance with various combinations of said settings, in order to obtain an optimum photographic reproduction of said scene being photographed.

3. The invention as set forth in claim 2 wherein said camera means further includes:
   lens means positioned between said light sensitive film and said scene being photographed; and
   means coupling said lens means with said calculator means whereby said lens means is automatically adjusted in variable accordance with settings of said calculator means.

4. The invention as set forth in claim 3 wherein said lens means includes aperture means, said aperture means being coupled to said calculator means whereby said aperture means is automatically adjusted in variable accordance with settings of said calculator means.

5. The invention as set forth in claim 3 wherein said coupling means couples said lens means with said second and third selection means whereby said lens means is automatically adjusted in variable accordance with said second and third independent variables.

6. The invention as set forth in claim 4 wherein said first independent variable is representative of the light output of said light producing means, said second independent variable is representative of a selected film for use in said camera means, and said third independent variable is representative of a selected range from said camera to said scene being photographed, said dependent variable being representative of the $f$ number of said lens means.

7. An apparatus comprising:
- a sensing means operative to monitor a selectively produced condition and provide a monitor signal in variable accordance therewith;
- first conditioning means for adjusting the effective sensitivity of said sensing means;
- first selection means coupled to said first conditioning means and selectively operable to establish a reference indicium and adjust said first conditioning means in variable accordance therewith, said reference indicium being representative of a first independent variable affecting said monitored condition;
- second selection means having first and second sets of indicia thereon, said second selection means being selectively adjustable for relating a setting of said first set of indicia, representative of a second independent variable affecting said monitored condition, to said reference indicium, whereby to fix said second selection means in position with respect to said reference indicium;
- second conditioning means operative to adjust the effective sensitivity of said sensing means; and
- third selection means coupled to said second conditioning means, said third selection means having indicia thereon, said last-mentioned indicia being representative to a third independent variable affecting said monitored condition, said third selection means being selectively operable for selecting one of said last-mentioned indicia and adjusting said second conditioning means in variable accordance therewith, while designating a corresponding one of said second set of indicia, said second set of indicia being representative of a variable dependent upon the selected combination of said first, second, and third independent variables.

* * * * *